United States Patent [19]

Heinrich et al.

[11] Patent Number: 4,582,530

[45] Date of Patent: Apr. 15, 1986

[54] METHOD OF MAKING A VALVE METAL POWDER FOR ELECTROLYTIC CONDENSERS AND THE LIKE

[75] Inventors: Hans J. Heinrich, Stein; Meinhard Aits, Burgfarrnbach, both of Fed. Rep. of Germany

[73] Assignee: GFE Gesellschaft fur Elektrometallurgie mbH, Dusseldorf, Fed. Rep. of Germany

[21] Appl. No.: 638,223

[22] Filed: Aug. 6, 1984

[30] Foreign Application Priority Data

Aug. 24, 1983 [DE] Fed. Rep. of Germany ....... 3330455

[51] Int. Cl.$^4$ ................................................. B22F 9/00
[52] U.S. Cl. .............................. 75/0.5 AB; 75/0.5 BB;
75/121; 75/251; 75/101 R
[58] Field of Search ..................... 75/0.5 B, 251, 255,
75/101, 121, 0.5 BB, 0.5 AB

[56] References Cited

U.S. PATENT DOCUMENTS

| 3,647,415 | 3/1972 | Yano et al. | 75/0.5 BB |
| 3,825,802 | 7/1974 | Kumagai et al. | 361/433 |
| 4,009,007 | 2/1977 | Fry | 29/182.5 |
| 4,128,421 | 12/1978 | Marsh | 75/251 |
| 4,356,028 | 10/1982 | Bates | 75/0.5 AB |

FOREIGN PATENT DOCUMENTS 2068924 8/1981 United Kingdom .

*Primary Examiner*—Christopher W. Brody
*Attorney, Agent, or Firm*—Karl F. Ross; Herbert Dubno

[57] ABSTRACT

In the production of a vanadium group valve metal powder, especially tantalum, the reaction mixture of a double fluoride salt of the valve metal and metallic sodium and/or potassium is doped with sulfur before a melt cake is formed. The melt cake is then leached with water to eliminate central salts leaving the valve metal powder. The sulfur doping provides improved surface area and particle size characteristics.

14 Claims, No Drawings

METHOD OF MAKING A VALVE METAL POWDER FOR ELECTROLYTIC CONDENSERS AND THE LIKE

FIELD OF THE INVENTION

Our present invention relates to a method of making a valve metal powder for electrolytic condensers and, more particularly, for making such a powder from a metal of the vanadium group (Va) of the Periodic System of chemical elements.

BACKGROUND OF THE INVENTION

Valve metals are metals on which anodic films can be formed and are referred to as such because of the rectifying characteristic of their anodic oxides. These metals include the vanadium group of elements, namely, the elements of Group Va of the Periodic System, i.e. vanadium, niobium and tantalum. Of these metals, tantalum has been found to be especially desirable in the production of electrolytic condensers and, for the production of such capacitors, it is known to produce tantalum powder by a chemical process.

In particular, it is known to produce tantalum powder by forming a reaction mixture of a double fluoride salt of the valve metal and metallic sodium and/or potassium and to react this mixture in the presence of a doping element to form a melt cake from which the reaction products which are water soluble can be leached to leave the valve metal in the form of a powder or in a form which can be readily broken up to produce the powder.

The product has been found to be especially suitable for use as electrodes for electrolytic condensers and the like.

To produce these electrodes, the powder is compacted to form a "green" body or compact which is thereafter sintered. Upon the sintered electrode a dielectric film is then formed.

For high electrical capacitance, it is important that the valve metal powder have an especially small particle size and hence large surface area. It is known to produce powders in the manner described from, for example, United Kingdom Pat. No. 2,068,924 in which the doping element is phosphorus.

While this process can produce a finely divided product with a large surface area, the method has many disadvantages and even with respect to the particle size and high surface area may not be fully satisfactory.

OBJECTS OF THE INVENTION

Accordingly, it is an object of the invention to provide a method of producing a valve metal powder with an especially fine grain structure and even greater surface area for improved electrical capacitance.

Another object of the invention is to provide an improved method of making a valve metal powder of a member of the vanadium group of metals which is free from disadvantages characterizing the earlier method.

SUMMARY OF THE INVENTION

We have discovered, most surprisingly, that by substituting sulfur as a doping element for the phosphorus used in the prior art, in a method as previously described, it is possible to improve the surface area and the fine division of the valve metal powder which is obtained.

This, it will be appreciated, is highly unexpected, at least in part because there was no way to predict that the choice of the doping element could have such a salutary effect.

The sulfur which can be used can be in the form of elemental sulfur, e.g. flower or sulfur, in the form of inorganic sulfur compounds such as sodium sulfate and sodium dithionite or in the form of organic sulfur compounds such as mercaptans. The sulfur can be supplied as mixtures of these sulfur-containing substances. The sulfur compounds or products which are used, of course, should be selected so that they are leachable from the melt cake during the leaching operation.

The amount of sulfur used for doping according to the invention must be an effective amount and the effective amount can be easily determined by experimentation. In general, we have found it to be advantageous to utilize elemental sulfur and/or one or more of the sulfur compounds mentioned in concentrations such that the reaction mixture contains 20 to 500 ppm with respect to the valve metal content of the reaction mixture.

According to the invention, the reaction mixture can be initially formed and the elemental sulfur and/or the sulfur compounds then added thereto. It is also possible, in accordance with the invention, to first form the double fluoride salt of the valve metal and to add the elemental sulfate and/or the sulfur compounds to the double fluoride salt before the reaction mixture is formed. The reaction mixture can then be produced by combining the double fluoride salt with the fluoride binding component, e.g. elemental sodium.

In a preferred embodiment of the invention, the elemental sulfur and/or the sulfur contents are added during the formation of the double fluoride salt of the valve metal so that they participate in forming or are trapped interstitially in the crystals of the double fluoride salt.

In addition to being free from various disadvantages resulting from the handling of phosphorus, the method of the invention provides a valve metal powder, especially tantalum powder, with an exceptionally high specific surface area and small particle size.

SPECIFIC EXAMPLES

EXAMPLE 1

1,022 kg of $K_2TaF_7$ is mixed iwth the stoichiometrically required quantity of metallic sodium necessary to remove the fluoride and with 0.3 kg of sodium chloride. The mixture is heated under a protective gas (nitrogen) to a temperature of 900° C. and is held at this temperature for one hour. The result is a melt cake which is then leached to solubilize the sodium fluoride, potassium fluoride and sodium chloride from the tantalum metal powder which results.

Parallel tests were undertaken with mixtures as described and under the aforementioned conditions with the addition of (a) 100 ppm sulfur, (b) 200 ppm sulfur, (c) 500 ppm sulfur with reference to the tantalum and in the form of $Na_2SO_4$ under identical conditions. The surface area of the powder was measured by the BET method and the mean grain size by FSSS method with the following results:

| Test | 1 | 1a | 1b | 1c |
| --- | --- | --- | --- | --- |
| Surface area (BET) ($m^2/g$) | 0.20 | 0.29 | 0.64 | 0.60 |
| Mean grain size (FSSS) ($\mu$) | 2.9 | 1.6 | 1.2 | 1.1 |

EXAMPLE 2

The reaction mixture was formed and processed as described in Example 1. 200 ppm sulfur relative to the tantalum was supplied in the form of flowers of sulfur.
The following results were obtained:
Surface area (BET) ($m^2/g$): 0.36
Mean grain size (FSSS) ($\mu$): 1.5

EXAMPLE 3

The reaction mixture was formed as processed as described in Example 1. 200 ppm sulfur relative to the tantalum was added in the form of sodium dithionite.
The following results were obtained:
Surface area (BET) ($m^2/g$): 0.39
Mean grain size (FSSS) ($\mu$): 1.4

EXAMPLE 4

110 kg $K_2TaF_7$ is mixed with stoichiometrically required quantity of sodium (32.3 kg), 30 kg of sodium chloride and 44 g of $Na_2SO_4$. The reaction mixture is heated under a protective gas (nitrogen) to 900° C. and is maintained at this temperature for one hour to form a melt cake. The melt cake is then leached with water to yield a tantalum powder which was analyzed for surface area and mean particle size with the following results:
Surface area (BET) ($m^2/g$): 0.4
Mean grain size (FSSS) ($\mu$): 1.4.

We claim:

1. A method of making a valve metal powder of a metal of the vanadium group of metals of the periodic system which comprises the steps of:
   forming a reaction mixture of a double fluoride salt of said valve metal and metallic sodium or potassium or both;
   doping said reaction mixture with an effective amount of sulphur;
   heating the reaction mixture doped with sulfur to form a melt cake; and
   leaching water soluble salts from said melt cake to yield said powder.

2. The method defined in claim 1 wherein said metal is tantalum.

3. The method defined in claim 2 wherein the sulfur is introduced into said mixture in the form of elemental sulfur.

4. The method defined in claim 3 wherein said elemental sulfur is flowers of sulfur.

5. The method defined in claim 2 wherein the sulfur is introduced into said reaction mixture in the form of an inorganic sulfur compound.

6. The method defined in claim 5 wherein said inorganic sulfur compound is selected from the group which consists of sodium sulfate and sodium dithionite.

7. The method defined in claim 2 wherein the sulfur is added to said reaction mixture in the form of an organic sulfur compound.

8. The method defined in claim 2 wherein the sulfur is added to said reacton mixture in the form of a mixture of two members selected from the group which consists of elemental sulfate an inorganic sulfur compound and an organic sulfur compound.

9. The method defined in claim 2 wherein the sulfur is added to said reaction mixture in the form of a compound which can be leached from said cake with said salts.

10. The method defined in claim 2 wherein the sulfur is added to said reaction mixture in an amount of 50 to 500 ppm sulfur referred to said valve metal.

11. The method defined in claim 2 wherein the sulfur is added to said reaction mixture by first forming said reaction mixture and then adding sulfur thereto.

12. The method defined in claim 2 wherein the sulfur is added to said reaction mixture by combining sulfur with said double fluoride salt and then forming the reaction mixture.

13. The method defined in claim 2 wherein the sulfur is added to said reaction mixture by incorporating it into the double fluoride salt during the mixture thereof and then forming said reaction mixture.

14. A valve metal powder having improved surface area and reduced particle size as made by the method of claim 1.

* * * * *